(12) United States Patent
Tsujimoto et al.

(10) Patent No.: US 10,996,043 B2
(45) Date of Patent: May 4, 2021

(54) METHOD FOR CONTROLLING SMALL-SIZED MEASUREMENT DEVICE

(71) Applicant: MITUTOYO CORPORATION, Kanagawa (JP)

(72) Inventors: Yasuhiro Tsujimoto, Kawasaki (JP); Yuji Fujikawa, Kure (JP)

(73) Assignee: MITUTOYO CORPORATION, Kawasaki (JP)

( * ) Notice: Subject to any disclaimer, the term of this patent is extended or adjusted under 35 U.S.C. 154(b) by 132 days.

(21) Appl. No.: 16/353,239

(22) Filed: Mar. 14, 2019

(65) Prior Publication Data

US 2019/0323813 A1    Oct. 24, 2019

(30) Foreign Application Priority Data

Apr. 20, 2018  (JP) .............................. JP2018-081899

(51) Int. Cl.
*G01B 3/18* (2006.01)
*G01B 3/00* (2006.01)

(52) U.S. Cl.
CPC ............... *G01B 3/18* (2013.01); *G01B 3/008* (2013.01)

(58) Field of Classification Search
CPC .......... G01B 3/18; G01B 3/008; G01B 3/205; G01B 3/22; G05B 19/04
USPC ......................................................... 33/815
See application file for complete search history.

(56) References Cited

U.S. PATENT DOCUMENTS

| | | | | |
|---|---|---|---|---|
| 9,212,883 B2* | 12/2015 | Emtman | ................... | G01B 3/20 |
| 9,267,779 B2* | 2/2016 | Emtman | ................ | G01B 3/205 |
| 9,347,757 B2* | 5/2016 | Emtman | ................ | G01B 3/205 |
| 9,417,094 B2* | 8/2016 | Cook | ...................... | G01B 3/205 |
| 9,612,099 B2* | 4/2017 | Emtman | ................ | G01B 3/205 |
| 2013/0276319 A1* | 10/2013 | Tsuji | ........................ | G01B 3/18 |
| | | | | 33/819 |
| 2014/0150570 A1* | 6/2014 | Nahum | ................... | G01D 21/02 |
| | | | | 73/862.541 |
| 2015/0059480 A1* | 3/2015 | Dockrey | ................... | G01B 3/18 |
| | | | | 73/649 |
| 2015/0247742 A1* | 9/2015 | Cook | ....................... | G01B 5/00 |
| | | | | 33/784 |
| 2015/0276366 A1* | 10/2015 | Emtman | ................ | G01B 3/205 |
| | | | | 33/701 |

(Continued)

FOREIGN PATENT DOCUMENTS

| | | | |
|---|---|---|---|
| JP | 3751540 B2 | 3/2006 | |
| JP | 4806545 B2 | 11/2011 | |

OTHER PUBLICATIONS

"Manual of Adjustable Measuring Force Digimatic Micrometer". User's Manual No. 99MAB018M3 Series No. 227, URL <https://manual.mitutoyo.co.jp/categories/list?ct=347&page=2>.

*Primary Examiner* — Yaritza Guadalupe-McCall
(74) *Attorney, Agent, or Firm* — Oliff PLC

(57) ABSTRACT

There is provided a method for controlling a small-sized adjustable measuring force measurement device capable of appropriately setting the origin.

A central control unit changes an operation mode to an origin setting mode in response to predetermined mode changing operation. The central control unit sets a counter value of an encoder to zero as an origin when a measuring force detecting means detects that a movable member is brought into contact with an object to be measured at a predetermined pressure in the origin setting mode.

3 Claims, 5 Drawing Sheets

(56) References Cited

U.S. PATENT DOCUMENTS

2015/0316365 A1* 11/2015 Emtman ................. G01B 3/20
33/701
2019/0323813 A1* 10/2019 Tsujimoto ............... G01B 3/18

* cited by examiner

METHOD FOR CONTROLLING SMALL-SIZED MEASUREMENT DEVICE

INCORPORATION BY REFERENCE

This application is based upon and claims the benefit of priority from Japanese patent application No. 2018-081899, filed on Apr. 20, 2018, the disclosure of which are incorporated herein in its entirety by reference.

BACKGROUND OF THE INVENTION

1. Field of the Invention

The present invention relates to a method for controlling a small-sized measurement device.

2. Description of Related Art

There are known digital micrometers capable of setting a measuring force to a desired value (JP 3751540 B and JP 4806545 B). FIG. 1 is a diagram showing an example of an adjustable measuring force micrometer 1. The micrometer 1 includes a U-shaped main frame (main part) 3, an anvil 31, a spindle (movable member) 2, a thimble 44, a plurality of buttons 521, a digital display 51, an electronic unit 5, and a measuring-force adjustment unit 60.

The anvil 31 is provided on the inner end face at one end side of the main frame 3. The spindle 2 is screwed into the other end of the main frame 3 so as to move forward and backward with respect to the anvil 31 by rotation. The thimble 44 is provided at the other end side of the main frame 3 so as to rotate integrally with the spindle 2. The spindle 2 moves forward and backward by rotating the thimble 44. The buttons 521 and the digital display 51 are arranged on a side face of the main frame 3. One of the buttons 521 is an origin setting button (ORIGIN).

The electronic unit 5 is mounted inside the main frame 3. FIG. 3 shows a functional block of the micrometer 1. The electronic unit 5 includes an encoder 71 and a central control unit 72. The encoder 71 detects the displacement or the position of the spindle 2. The central control unit 72 controls entire operation of the micrometer 1. The central control unit 72 includes a counter that counts spindle positions based on a detection signal from the encoder 71. Then, the central control unit 72 displays a value of the counter and the like on the display 51.

FIG. 2 is a schematic diagram for explaining the measuring-force adjustment unit 60. The measuring-force adjustment unit 60 includes an adjustment screw 61, a spring 62, and a measuring force switch 63. The adjustment screw 61 is provided at the other end side of the spindle 2, and the spring 62 is interposed between the adjustment screw 61 and the other end of the spindle 2. The adjustment screw 61 is rotated with an exclusive tool (for example, a slotted screwdriver) to adjust a spring pressure, thereby setting a measuring force to a desired value (predetermined pressure). The measuring force switch 63 operates according to the change in the distance between the spindle and the adjustment screw 61. It is assumed that the thimble 44 is rotated to move the spindle 2 forward and, then, the spindle 2 is brought into contact with a workpiece or the like and does not move farther. When the thimble 44 is further rotated in this condition, the spindle 2 does not move but the adjustment screw 61 moves forward, and the spring pressure is applied on the spindle 2. The measuring force switch 63 operates at the moment when the distance between the spindle 2 and the adjustment screw 61 changes, that is, when the spring pressure is applied on the spindle 2 and the measuring force reaches the predetermined pressure.

With this configuration, the origin is set as follows.
FIG. 4 is also referred to.
This procedure is also disclosed in, for example, Non-Patent Literature 1 (Manual of adjustable measuring force digimatic micrometer "User's manual No. 99MAB018M3 Series No. 227", https://manual.mitutoyo.co.jp/categories/list?ct=347&page=2).

(Step 1) First, the spindle 2 is once moved backward, and a master workpiece MW (or a gauge block) is placed between the spindle 2 to the anvil 31.

(Step 2) The thimble 44 is gently rotated to bring the spindle 2 and the anvil 31 into contact with the master workpiece MW.

(Step 3) From this condition, the thimble 44 is further rotated approximately one tenth of a rotation, and "H" meaning "hold" is lit on the display 51.

This means that "H" is displayed at the moment when the set measuring force is generated.

(Step 4) The user stops rotating the thimble 44 at the moment when "H" is lit.

(Step 5) Then, the user holds down the origin switch (521) (for 2 seconds or more).

(Step 6) Thus, the displayed value on the display 51 is reset to "0.000", and the origin for the desired measuring force is set.

Every time a measuring force is set to a desired value (a measuring force is changed), this origin setting is needed.

In the above setting, the origin is set to zero. Substantially similar procedure is performed to register the zero point. When "H" meaning "hold" is displayed, the user stops rotating the thimble 44 (steps 3 and 4), and registers a desired numerical value.

A workpiece is measured as follows (a normal measurement mode).

The spindle 2 is once moved backward, and a workpiece is placed between the spindle 2 and the anvil 31. The thimble 44 is gently rotated to hold the workpiece between the spindle 2 and the anvil 31. From this condition, the thimble 44 is further rotated approximately one tenth of a rotation, and "H" meaning "hold" is lit on the display 51, which means that the displayed value is automatically held. That is, the measurement value when the set measuring force is generated is held. The user observes the displayed value when "H" is displayed as the measurement value. In order to release the holding, the thimble 44 is reversely rotated to slightly move the spindle 2 backward, and a holding release switch is pressed.

SUMMARY OF THE INVENTION

As described above, in order to set the origin (or the zero point), the user needs to notice that "H" meaning "hold" is lit on the display 51 when a predetermined measuring force is generated and to stop rotating the thimble 44. However, the user's stopping the rotation of the thimble after noticing that "H" is lit depends on the reaction speed of a human. When the user stops rotating the thimble, the spindle can actually be moved forward farther than the position at the moment when "H" is lit. An adjustable measuring force micrometer is mainly used to measure a workpiece at an extremely-low measuring force. The user barely senses, on his/her hand rotating the thimble, that a master workpiece is brought into contact with the spindle at a predetermined measuring force, and tends to rotate the thimble too much over a desired measuring force. Once the origin set to be shifted, the workpiece cannot be precisely measured.

A purpose of the present invention is to provide a method for controlling a small-sized adjustable measuring force measurement device capable of appropriately setting the origin.

In an exemplary embodiment of the present invention, a small-sized measurement device includes:

a main part;

a movable member provided so as to move forward and backward with respect to the main part and to be brought into contact with an object to be measured;

an encoder that detects a position of the movable member;

a measuring force detecting means for detecting that the movable member is brought into contact with the object to be measured at a predetermined pressure; and a central control unit that receives a position detection signal from the encoder and a measuring force signal from the measuring force detecting means and controls entire operation.

The central control unit changes an operation mode to an origin setting mode in response to predetermined mode changing operation and sets a counter value of the encoder to zero as an origin when the measuring force detecting means detects that the movable member is brought into contact with the object to be measured at the predetermined pressure in the origin setting mode.

In an exemplary embodiment of the present invention, the central control unit preferably ends the origin setting mode after setting the counter value of the encoder to zero as the origin.

In an exemplary embodiment of the present invention, the small-sized measurement device is preferably any one of a micrometer, a caliper, and an indicator.

DETAILED DESCRIPTION

Figure 1:
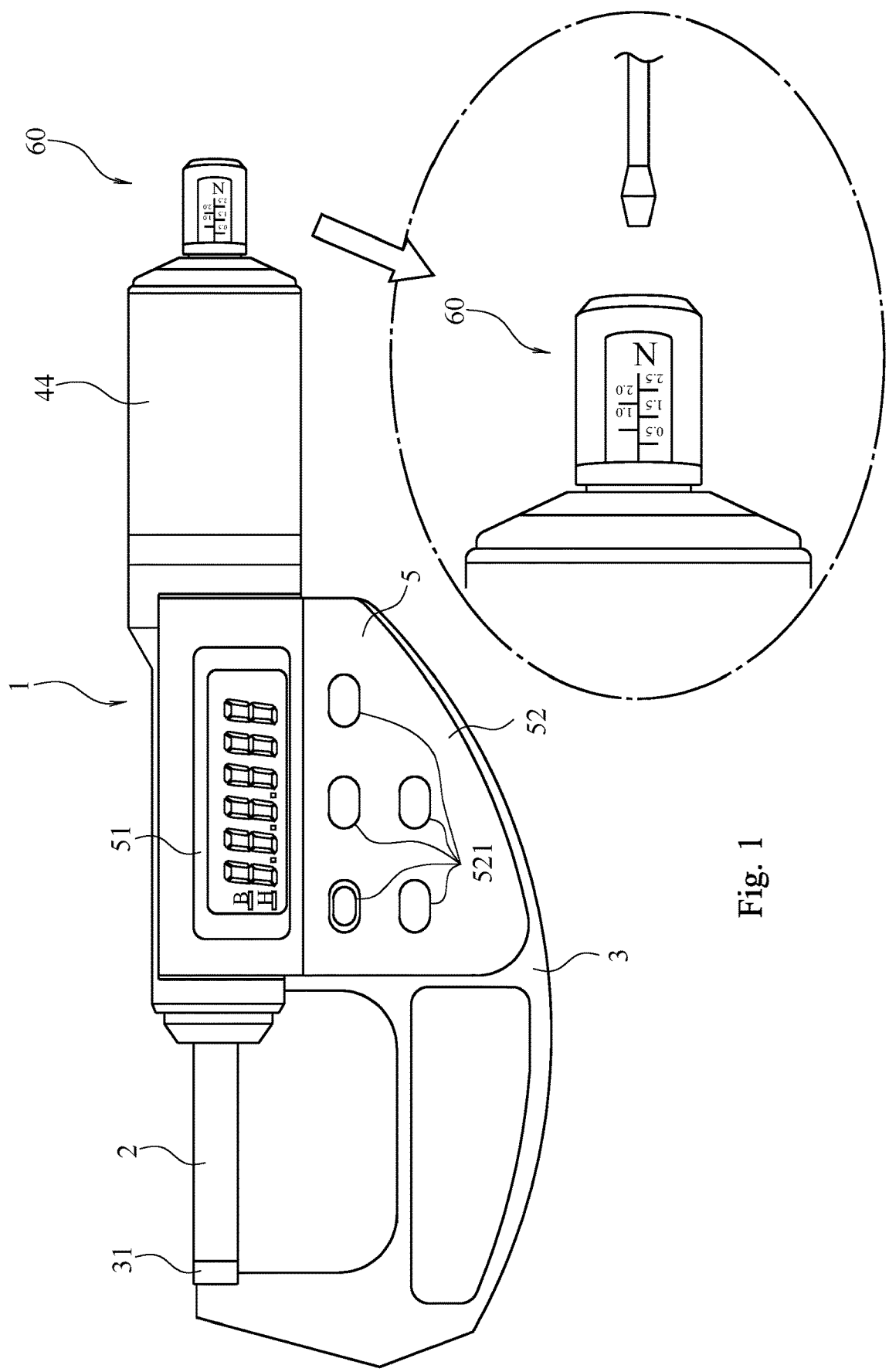
FIG. 1 is a diagram showing an example of an adjustable measuring force micrometer.
Figure 2:
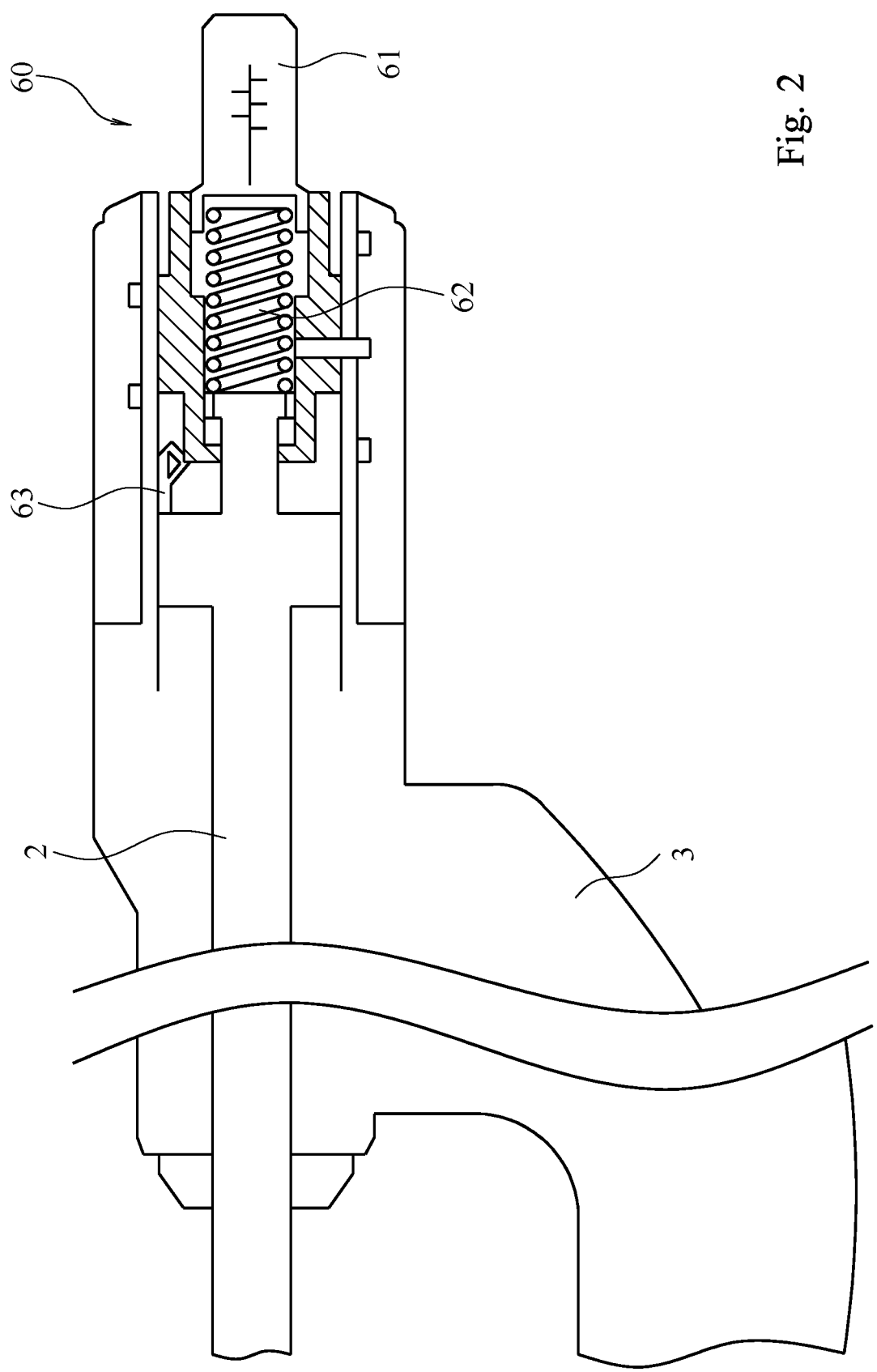
FIG. 2 is a schematic diagram showing a configuration example of a measuring-force adjustment unit.
Figure 3:
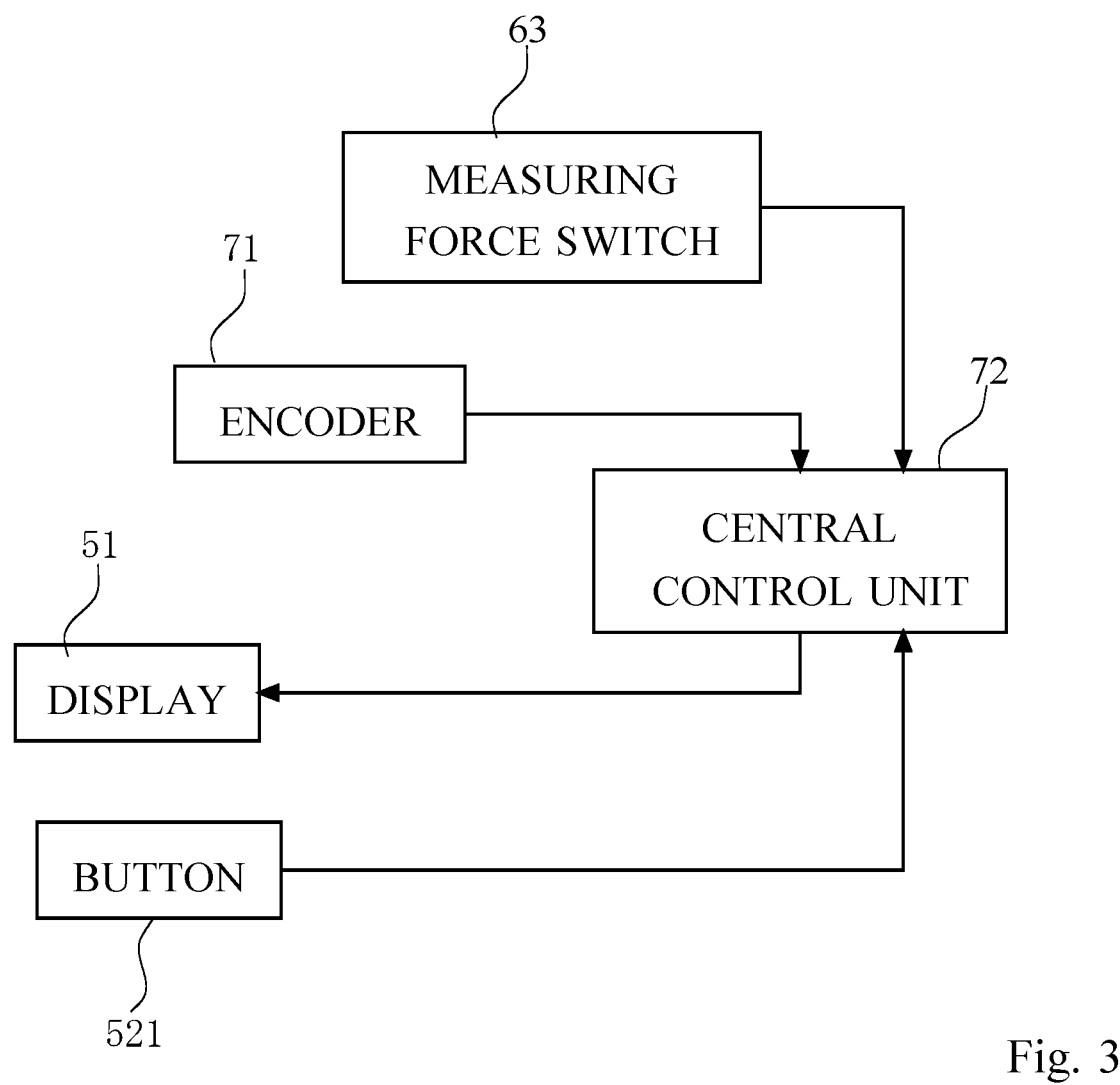
FIG. 3 is a functional block diagram of a micrometer.
Figure 4:
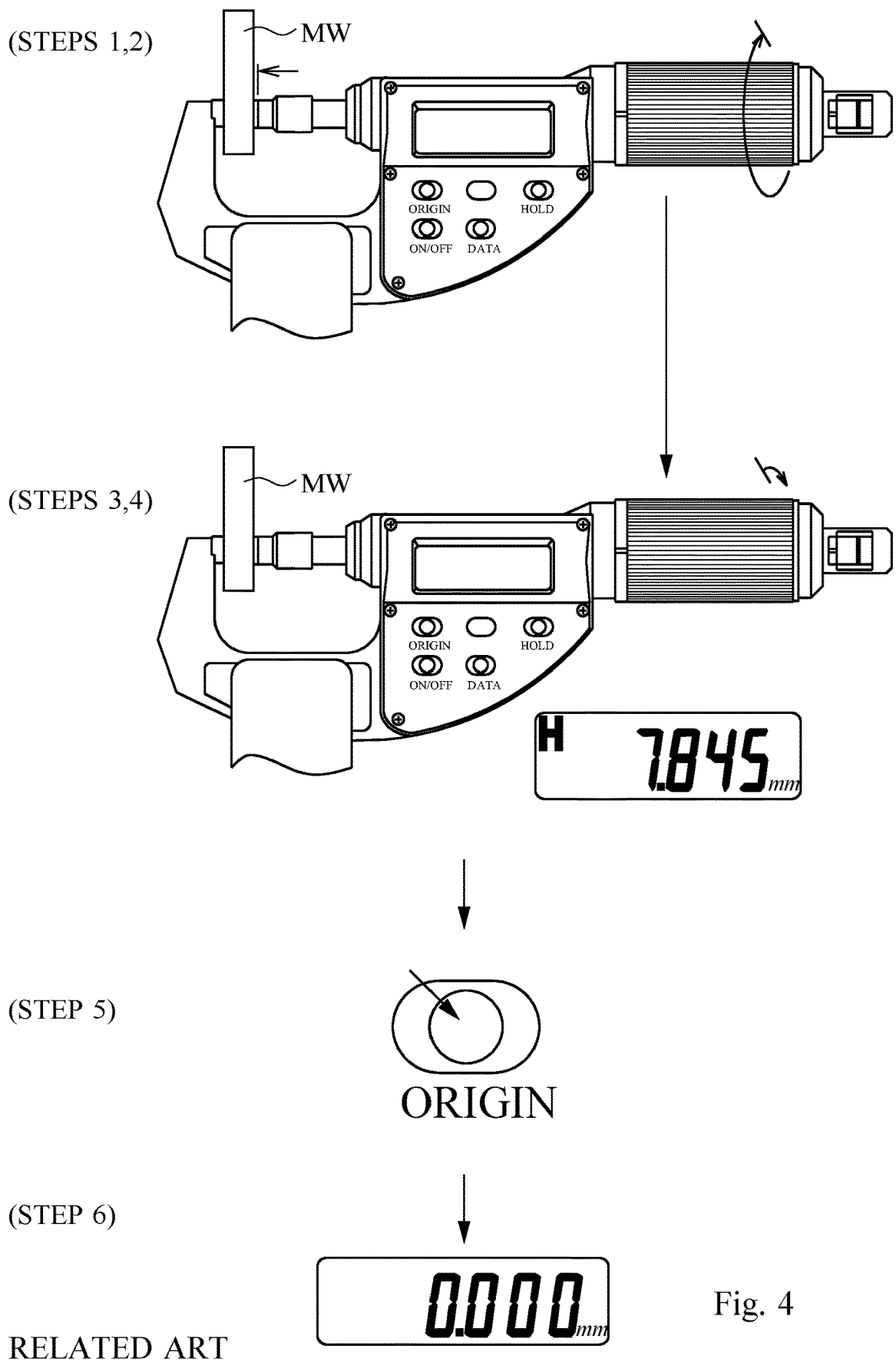
FIG. 4 is a diagram for explaining a conventional procedure of origin setting.

An exemplary embodiment of the present invention is illustrated and described with reference to reference signs assigned to elements in the drawings.

First Exemplary Embodiment

A method for controlling a micrometer according to a first exemplary embodiment of the present invention is described below.

Figure 5:
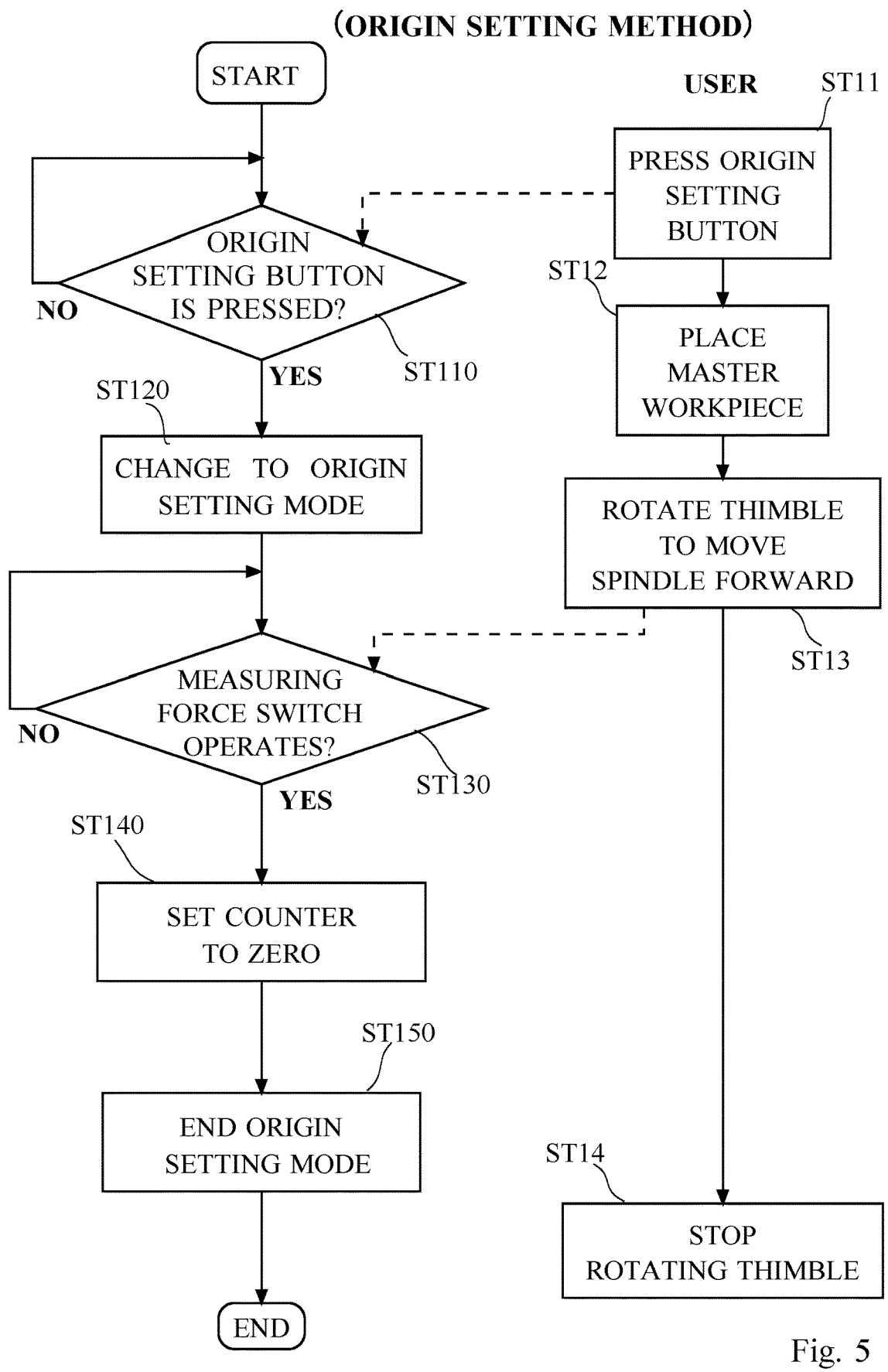
FIG. 5 is a flowchart showing a procedure of an origin setting method.

FIG. 5 is a flowchart showing a procedure of an origin setting method as a method for controlling a micrometer (small-sized measurement device).

The origin setting method is characterized in that an origin setting mode is provided as an exclusive mode for setting the origin. The operation for setting the origin is performed by the central control unit 72. The operation is described with reference to the flowchart.

First, a user sets a measuring force to a desired value. This is similar to the conventional procedure. After changing the measuring force, the user sets the origin. To set the origin, the user presses an origin setting button (521) (ST11). When the origin setting button (521) is pressed (ST110: YES), the central control unit 72 changes the operation mode to the origin setting mode. The central control unit 72 may, for example, blink "H" on the display 51 in order to notify the user of the change to the origin setting mode.

In the origin setting mode, the central control unit 72 sets the counter to zero at the moment when the measuring force switch 63 operates, thereby setting the origin. Specifically, the user places a master workpiece (or a gauge block) between the anvil 31 and the spindle 2 (ST12). Then, the user gently rotates the thimble 44 to move the spindle 2 forward (ST13). The spindle 2 is moved forward and brought into contact with the master workpiece. Although the user does not know visually and with the sense of fingers the strength of the pressure of the spindle 2 applied on the master workpiece, the user keeps gently rotating the thimble 44 after the contact.

When the spindle 2 is brought into contact with the master workpiece, and a predetermined measuring force is applied on the spindle 2 (the spindle 2 is brought into contact with the master workpiece at a predetermined pressure), the measuring force switch 63 operates (ST130: YES). The operation of the measuring force switch 63 is detected by the central control unit 72. When detecting the operation of the measuring force switch 63, the central control unit 72 resets the value of the counter to zero at that moment. Then, the central control unit 72 ends the origin setting mode (ST150). That is, the central control unit 72 changes the operation mode to the normal measurement mode. As the origin setting mode is ended, "H" on the display 51 disappears.

The user notices that the origin setting has been completed when the displayed value on the display 51 becomes zero (0.000) and "H" is not blinking. The user stops rotating the thimble 44 at that moment.

In this operation, the user can rotate the thimble 44 too much over the position of the predetermined measuring force. The displayed value on the display 51 at this moment is, for example, "−0.002" or the like. Since the thimble 44 is rotated after the origin setting mode is ended (that is, in the normal measurement mode), the displayed value, such as "−0.002", precisely indicates the position of the spindle 2 from the correctly set origin.

In order to register the zero point, while looking at the displayed value on the display 51, the user rotates the thimble 44 so that the displayed value is to be 0.000. (The thimble 44 is slightly rotated reversely to move the spindle 2 backward.) Then, when the displayed value becomes 0.000, the user registers a desired numerical value.

In this manner, it is possible to automatically set the correct origin regardless of the reaction speed of a human (user), according to the present exemplary embodiment.

Note that, the present invention is not limited to the above exemplary embodiment and can be modified without deviating from the scope of the invention.

The configuration of the measuring-force adjustment unit is only required to be capable of varying a measuring force and detecting that a predetermined measuring force is generated, and is not limited. For example, a pressure sensor (a strain gauge or the like) instead of the spring may be provided at the tip of the spindle or the anvil to detect a measuring force. Then, the desired measuring force may be stored and set in the central control unit.

The above exemplary embodiment has exemplified a micrometer, but the present invention is also applicable to a caliper or a dial indicator (indicator).

The invention claimed is:

1. A method for controlling a small-sized measurement device, the small-sized measurement device comprising:
a main part;
a movable member provided so as to move forward and backward with respect to the main part and to be brought into contact with an object to be measured;
an encoder configured to detect a position of the movable member;
a measuring force detecting means for detecting that the movable member is brought into contact with the object to be measured at a predetermined pressure; and
a central control unit configured to receive a position detection signal from the encoder and a measuring force signal from the measuring force detecting means and to control entire operation, the method comprising:
changing, by the central control unit, an operation mode to an origin setting mode in response to predetermined mode changing operation; and
setting, by the central control unit, in the origin setting mode, a counter value of the encoder to zero as an origin in response to and at a time of the measuring force detecting means detecting the predetermined pressure between the object to be measured and the movable member contacting the object.

2. The method for controlling the small-sized measurement device according to claim 1, further comprising ending, by the central control unit, the origin setting mode after the setting the counter value of the encoder to zero as the origin.

3. The method for controlling the small-sized measurement device according to claim 1, wherein the small-sized measurement device is any one of a micrometer, a caliper, and an indicator.

* * * * *